United States Patent Office 2,930,791
Patented Mar. 29, 1960

2,930,791

INTERMEDIATES TO MAKE 3-BETA, 14-BETA-DEHYDROXY - 20(22)CARDENOLIDE (DIGITOXIGENIN)

Peter D. Meister, Kalamazoo Township, Kalamazoo County, and Herbert C. Murray, Hickory Corners, Mich., assignors to The Upjohn Company, Kalamazoo, Mich., a corporation of Michigan No Drawing. Original application June 7, 1955, Serial No. 513,900. Divided and this application November 17, 1958, Serial No. 774,118

8 Claims. (Cl. 260—239.57)

The present invention relates to steroids and is more particularly concerned with a process of production for digitoxigenin and the new intermediates of this process:

4,14-pregnadiene-3,20-dione;
3α,21-dihydroxy- and 21-acyloxy-3α-hydroxy-14-pregnen-20-ones;
21-acyloxy-3α-(arylsulfonyloxy)-14-pregnen-20-ones;
3β,21-dihydroxy- and 3β,21-diacyloxy - 14 - pregnen - 20-ones;
3β,15β,21-trihydroxy- and 3β,21-diacyloxy-15β-hydroxy-14α-halopregnan-20-ones;
3β - acyloxy - 15β - hydroxy - 14α-halo-14α-card-20(22)-enolide and 3β-hydroxy- and 3β-acyloxy-14(15)-oxido-20(22)-cardenolide.

This invention is a continuation-in-part of application Serial Number 450,526, filed August 17, 1954, now Patent No. 2,889,255, and a division of application 513,900, filed June 7, 1955.

The process and compounds of the present invention are illustratively presented by the following formulae and equations:

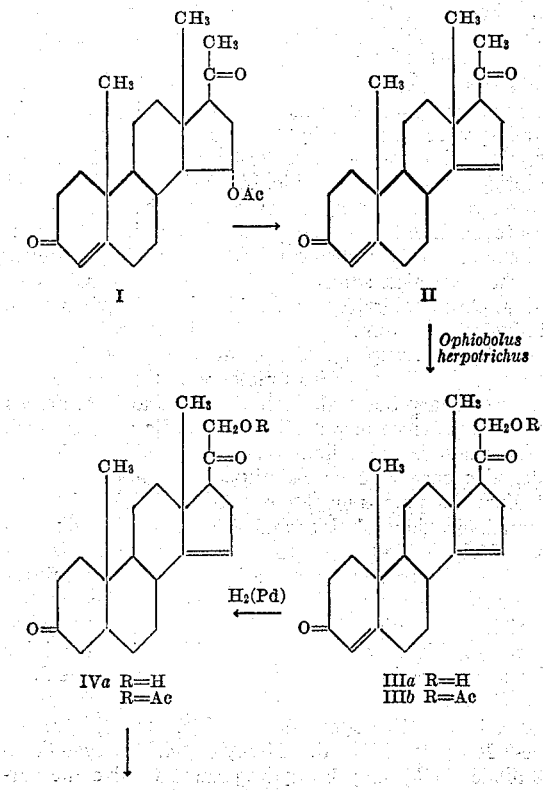

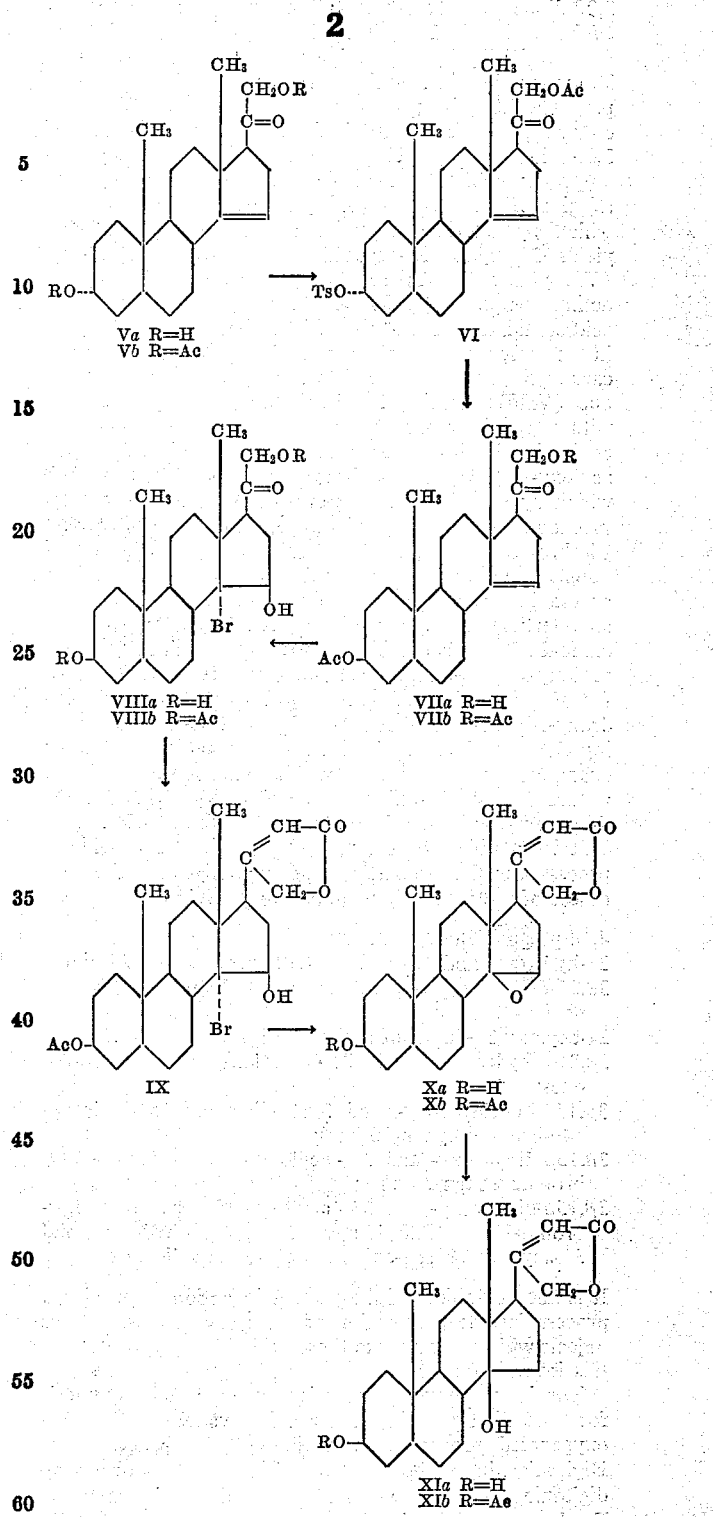

wherein AcO represents an acyloxy group, Ac being the acyl radical of an organic carboxylic acid containing from one to eight carbon atoms inclusive and TsO is an arylsulfonyloxy group. In the preferred embodiment of the process the acyl radical Ac is of a hydrocarbon carboxylic acid containing from one to eight carbon atoms and the arylsulfonyloxy group TsO is a para-toluene-sulfonyloxy group.

The process of the present invention comprises: pyrolysis of a 15α-acyloxyprogesterone (I) or alternatively dehydration of a 14α-hydroxyprogesterone to yield 4,14- pregnadiene-3,20-dione (II); subjecting 4,14-pregnadiene-3,20-dione (II) to fermentation by *Ophiobolus herpotrichus* to obtain 21-hydroxy-4,14-pregnadiene-3,20-dione (III) which by hydrogenation with hydrogen and a palladium-catalyst in a basic medium yields 21-hydroxy-14-pregnene-3,20-dione (IVa); esterification of (IVa) by conventional means to obtain 21-acyloxy-14-pregnene-3,20 dione (IVb); reducing the thus-obtained acyloxy-14-pregnene-3,20-dione (IVb) with sodium borohydride to give 21-acyloxy-3α-hydroxy-14-pregnen-20-one (Vb) which by esterification with an arylsulfonyl chloride yields 21-acyloxy-3α-arylsulfonyloxy-14-pregnen-20-one (VIb); converting the 3α-ester (VIb) to a 3β-ester by reacting compound (VIb) with a hydrocarbon carboxylic acid containing from one to eight carbon atoms, inclusive, in the presence of an alkali salt of the same hydrocarbon carboxylic acid to give 3β,21-diacyloxy-14-pregnen-20-one (VIIb); treating 3β,21-diacyloxy-14-pregnen-20-one with a hypobromous acid (HBrO) preferably N-bromoacylamide in the presence of an acid to yield 3β,21-diacyloxy-15β-hydroxy-14α-bromopregnan-20-one (VIIIb) which by submitting to a Reformatsky reaction (ethylbromoacetate and zinc) yielded 3β-acyloxy-15β-hydroxy-14α-bromo-14α-card-20(22)-enolide (IX); heating Compound IX with a mild base, such as sodium or potassium acetate in an organic polar solvent such as acetone, dioxane, tertiary butyl alcohol to yield 3β-acyloxy-14(15)-oxido-20(22)-cardenolide (Xb); hydrolyzing the 3β-acyloxy-14(15)-oxido-20(22)-cardenolide (Xb) thru fermentation with *Rhizopus shanghaiensis* to yield 3β-hydroxy-14(15)-oxido-20(22)-cardenolide (Xa) and treating Compound (Xa) dissolved in an organic solvent, for example, dioxane with an alkali metal borohydride to reduce the 14(15)-oxido bond and thus to give 3β,14β-dihydroxy-20(22)-cardenolide (digitoxigenin) (XIa).

It is an object of the present invention to provide a process for the preparation of digitoxigenin. Another object of the instant invention is to provide 4,14-pregnadiene-3,20-dione;
21-hydroxy- and 21-acyloxy-4,14-pregnadene-3,20-dione;
3α,21-dihydroxy- and 21-acyloxy-3α-hydroxy-4,14-pregnadien-20-ones;
21-acyloxy-3α-(arylsulfonyloxy)-14-pregnen-20-ones;
3β,21-dihydroxy- and 3β,21 - diacyloxy - 14 - pregnen-20-ones;
3β,15β,21-trihydroxy- and 3β,21-diacyloxy-15β-hydroxy-14α-bromopregnan-20-ones;
3β,15β-dihydroxy- and 3β - acyloxy - 15β - hydroxy - 14α-bromopregnan-20-ones;
3β,15β-dihydroxy- and 3β - acyloxy - 15β - hydroxy - 14α-bromo-14α-card-20(22)-enolide and 3β-hydroxy- and 3β-acyloxy-14(15)-oxido-20(22)-cardenolide.

It is another object of the present invention to provide a process for the preparation of these compounds. Other objects will be apparent to those skilled in the art to which this invention pertains.

The instant novel process is a valuable new synthesis for pure digitoxigenin from readily available 14- or 15-oxygenated progesterone, available from progesterone. Digitoxigenin is the aglycon of the natural occurring digitoxin and possesses almost equal cardiac activity. Furthermore digitoxigenin can be converted (Chen 1943, Elderfield et al., J. Am. Chem. Soc. 69, 2235 (1947)), into the synthetic glycoside, glucose-digitoxigenin, in which form, according to Chen et al., J. Pharmacol. Exptl. Therap. 103, 420 (1951), it possesses almost three times the cardiac activity of digitoxin. Synthetic preparation of a pure cardiac glycoside or its aglycon has the specific advantage of providing simplified dosage by weight instead of dosage based upon bioassay against primary standards as it is now necessary with the various digitalis preparations.

The starting materials of the present process are 14α-hydroxyprogesterone, prepared as shown, for example, in U.S. Patent 2,670,358, and 15α-hydroxyprogesterone esters, preferredly the 15α-acyloxy esters wherein the acyloxy group is AcO, Ac being the acyl radical of a carboxylic acid containing from one to eight carbon atoms, inclusive, the preparations of which are shown in Preparations 1 through 4.

In carrying out the process of the instant invention the selected 15α-hydroxyprogesterone-15α-acylate (I) is pyrolyzed suitably in a combustion tube in a combustion furnace at a temperature between 275 and 400 degrees centigrade. In the preferred embodiment of the invention the pyrolysis of the selected 15α-acyloxyprogesterone (I) to obtain 4,14-pregnadiene-3,20 dione (II) is carried out by distilling Compound (I) thru a tube in an inert gas atmosphere, extracting the distillate with suitable organic water-immiscible solvents such as methylene dichloride, ethylene dichloride, chloroform, carbon tetrachloride, Skellysolve B hexane hydrocarbons, and the like and purifying the thus obtained material by conventional means such as recrystallization, extraction or chromatography or combinations thereof. Alternatively, 14α-hydroxyprogesterone may be used as starting material. The 14α-hydroxyprogesterone is dehydrated by heating it, dissolved in an acid anhydride, such as acetic anhydride in the presence of an equal, or two to three times larger weight of potassium acid sulfate compared to the weight of the steroid. Such a reaction mixture is conveniently heated on the steam bath and after a period of half an hour, cooled with ice, diluted with water and maintained at room temperature for sixteen hours. From the aqueous solution the 4,14-pregnadiene-3,20-dione may be isolated by extraction and purified by conventional means such as chromatography, extractions and recrystallization or combinations thereof.

The thus-obtained 4,14-pregnadiene-3,20-dione (II) is submitted to fermentation by *Ophiobolus herpotrichus* in a suitable fermentation medium containing assimilable carbohydrates and nitrogen such as proteins or amino acids, and mineral factors, as shown in the example. The fermentation process is aided by aeration and agitation as well as by regulating the temperature to about 25 to 32 degrees centigrade. In the preferred embodiment of the invention, *Ophiobolus herpotrichus* is first grown in the fermentation medium under aeration and agitation for a period of 24 hours before the addition of the steroid to be fermented. After a period of twelve to 72 hours the fermentation is interrupted and the steroids in the mixture are isolated by conventional means such as extraction with organic solvents, for example, methylene dichloride, ethylene dichloride, chloroform, acetone, and mixtures thereof. From the extractives the 21-hydroxy-4,14-pregnadiene-3,20-dione (IIIa) is obtained by conventional means such as trituration of the oily residues after the extraction solvent has been removed, recrystallization, chromatography or combination of such means.

21-hydroxy-4,14-pregnadiene-3,20 dione (IIIa), thus prepared, is thereupon hydrogenated, suitably dissolved in an organic solvent such as methanol, ethanol, acetone, dioxane, tertiary butyl alcohol, with methanol preferred and in the presence of palladium in a basic medium such as, for example, palladium on a zinc oxide, cadmium oxide, zinc carbonate or cadmium carbonate carrier, or palladium in potassium hydroxide, sodium hydroxide, barium hydroxide solution, and the like. The thus obtained 21-hydroxy-14-pregnene-3,20-dione (IVa) is isolated from the reaction mixture by eliminating by filtration or selective extraction of the steroid the catalyst material, evaporating the resulting solution, and extracting, recrystallizing or chromatographing the remaining residue to obtain pure 21-hydroxy-14-pregnene-3,20-dione (IVa).

Instead of hydrogenating 21-hydroxy-4,14-pregnadiene-3,20-dione (IIIa) the 21-acyloxy-4,14-pregnadiene-3,20-dione (IIIb) may be hydrogenated to give the corresponding 21-acyloxy-14-pregnene-3,20-dione (IVb). 21-acyloxy-14-pregnene-3,20-dione may also be obtained by esterification of the 21-hydroxy-14-pregnene-3,20-dione (IVa). Esterification of either the 21-hydroxy-4,14-pregnadiene-3,20-dione (IIIa) or of 21-hydroxy-14-pregnene-3,20-dione (IVa) is carried out by conventional means such as by mixing either of the starting compounds with an acylating agent, for example, ketene, a ketene of a selected acid, an acid, such as formic acid, an acid chloride or acid bromide, an acid anhydride or other known acylating agents, usually in a solvent such as, for example, pyridine or the like or an inert solvent, including solvents like benzene, toluene, ether, and the like, and heating to a temperature between about zero degrees centigrade and the boiling point of the reaction mixture, usually about room temperature (twenty to thirty degrees centigrade) for a period between about a half an hour and about 96 hours. The time of reaction is somewhat dependent upon the temperature at which the reaction is carried out, the acylating agent, and the ratio of reactants. The reaction mixture is quenched with ice or cold water and the product is collected in an organic solvent which is thereafter washed with successive portions of a mildly basic solution and water to obtain a solution of the product which is essentially neutral. In some instances the product recrystallized from the reaction mixture, in which case it may be advantageous to separate the product by filtration or other means, wash with water and thereafter purify by conventional means such as for example by recrystallization from a suitable solvent or chromatographic purification, as deemed necessary. The acyloxy groups preferably replacing the 21-hydroxyl groups in either 21-hydroxy-4,14-pregnadiene-3,20-dione or 21-hydroxy-14-pregnene-3,20-dione are the acyloxy radicals of hydrocarbon carboxylic acid containing from one to eight carbon atoms, inclusive. Obviously other carboxylic acids can be used, however, they are of no special advantage since these acyloxy residues are eventually removed in the subsequent and final steps of the present synthesis, and since such carboxylic acid groups require the use of more expensive acids than those of the common hydrocarbon carboxylic acids containing from one to eight carbon atoms, inclusive, such as formic, acetic, propionic, butyric, isobutyric, valeric, isovaleric, hexanoic, heptanoic, octanoic, $\beta$-cyclopentylpropionic, benzoic, toluic, phenylacetic, and the like.

The thus obtained 21-hydroxy-14-pregnene-3,20-dione (IVa) or in the preferred embodiment the thus obtained 21-acyloxy-14-pregnene-3,20-dione (IVb) is then reduced with sodium borohydride to give the corresponding 21-hydroxy- or 21-acyloxy-3$\alpha$-hydroxy-14-pregnen-20-one. The reduction is preferably carried out while the selected steroid is dissolved in dioxane, ether or tetrahydrofuran at a temperature of minus ten to plus 20 degrees. The sodium borohydride is preferably added under vigorous stirring dissolved in a very small amount of sodium or potassium hydroxide solution. A concentration of 50 to 100 milligrams of sodium borohydride per milliliter of 0.05 to 0.2 normal sodium hydroxide solution is used. The reaction time is between five to ten minutes and two hours; commonly fifteen to 30 minutes are sufficient to reduce Compounds IVa or IVb to the corresponding 21-hydroxy- or 21-acyloxy-3$\alpha$-hydroxy-14-pregnen-20-one (Va and Vb). Products V are isolated from the reaction mixture by neutralizing the reaction mixture with a dilute acid, for example, dilute hydrochloric acid and extracting Compound V with a water-immiscible solvent such as methylene dichloride, chloroform, carbon tetrachloride, ethylene dichloride, Skellysolve B hexanes, and the like. The extracts are then treated in conventional manner, that is products Vb, 21-acyloxy-3$\alpha$-hydroxy-14-pregnen-20-ones are obtained by removing through distillation the solvent and purifying the residue in conventional manner such as by recrystallization and chromatography.

The thus-obtained 21-acyloxy-3$\alpha$-hydroxy-14-pregnen-20-one (Vb) is then esterified in the 3-position with an arylsulfonic acid. For this purpose 21-acyloxy-3$\alpha$-hydroxy-14-pregnen-20-one is dissolved in pyridine or in an inert solvent such as benzene, toluene, dioxane, acetone, and the like, and thereto is added an arylsulfonic acid halide. Arylsulfonyl halides useful for this purpose include particularly the benzenesulfonyl chlorides such as para-toluenesulfonyl chloride, para-chlorobenzenesulfonyl chloride, para-bromobenzenesulfonyl chloride, para-nitrobenzenesulfonyl chloride and $\beta$-naphthylsulfonyl chloride and $\beta$-naphthylsulfonyl bromide with para-toluenesulfonyl chloride preferred. The esterification with the selected arylsulfonyl halide is preferably carried out at room temperature by maintaining the mixture for a period of three to 24 hours whereafter the ester is isolated by conventional methods, such as precipitation from the mixture after water had been added, filtration and recrystallization to purify the material and to obtain pure 21-acyloxy-3$\alpha$-arylsulfonyloxy-14-pregnen-20-one (VI).

The 21-acyloxy-3$\alpha$-(arylsulfonyloxy)-14-pregnen-20-one (VI) is converted to the corrresponding 3$\beta$-isomer esters by treating it in solution of a carboxylic acid containing from one to eight carbon atoms, inclusive, and having a melting point below fifty degrees centigrade with the corresponding sodium or potassium hydrocarbon carboxylic acid acylate. In the preferred embodiment of the invention the reaction mixture is boiled for a period of one to four hours and thereafter the excess carboxylic acid is removed. Evaporation aided by an air stream or vacuum distillation are the preferred means to remove the excess organic acid. The residue is purified by conventional means such as recrystallization from suitable solvents and/or chromatography when indicated. In this manner a 3$\beta$-ester, the 3$\beta$,21-diacyloxy-14-pregnen-20-one (VIIb) is obtained. Saponification of the 3$\beta$,21-diacyloxy-14-pregnen-20-one with sodium carbonate or dilute sodium hydroxide in aqueous alcoholic solution under nitrogen produces the corresponding 3$\beta$,21-diol, 3$\beta$,21-dihydroxy-14-pregnen-20-one (VIIa).

The thus obtained 3$\beta$,21-diacyloxy-14-pregnen-20-one (VIIb), dissolved in a suitable organic solvent such as methylene dichloride, ethylene dichloride, dioxane, tertiary butyl alcohol, chloroform, carbon tetrachloride and mixtures thereof is admixed with hypohalous acid or preferably with a reagent releasing a hypohalous acid such as an N-halohydrocarbon acid amide, for example, N-bromoacetamide, N-chloroacetamide, N-bromosuccinimide, N-chlorosuccinimide, when dissolved in an aqueous mineral acid acidified solution. In the preferred embodiment, two to three mole equivalents of the N-halohydrocarbon carboxylic acid amides are used for each molar equivalent of 3$\beta$,21-diacetoxy-14-pregnen-20-one (VIIb). To acidify the solution of the N-halohydrocarbon carboxylic acid amide, one to five acid equivalents of a mineral acid such as sulfuric, perchloric or periodic acid are used each molar equivalent of the N-halohydrocarbon carboxylic acid amide. After a reaction period of from five to sixty minutes any further reaction is prevented, for example, by adding sodium sulfite, dissolved in water. The solution is then concentrated in vacuo and poured into a large amount of chipped ice. The precipitate thus obtained is removed by filtration and if so desired purified, by recrystallization to give pure 3$\beta$,21-diacyloxy-15$\beta$-hydroxy-14$\alpha$-bromopregnan-20-one.

The thus-obtained 3$\beta$,21-diacyloxy-15$\beta$-hydroxy-14$\alpha$-bromopregnan-20-one (VIIIb), carefully dried with about an equal amount by weight of iodinated zinc granules in vacuo at about 100 degrees centigrade for a period of eighteen hours, was dissolved in an inert organic solvent such as dioxane, Skellysolve B hexanes, methylene dichloride, ethylene dichloride, chloroform, carbon tetrachloride, and thereafter admixed with ethyl bromoacetate. In the preferred procedure the ethyl bromacetate is added dropwise under stirring with regulation of the speed of reaction by heating or cooling the reaction flask as deemed necessary, usually cooling at the onset of the reaction and heating toward the end of the reaction. The thus-obtained 3β-acyloxy-15β-hydroxy - 14α - bromo- 14α - card - 20(22) - enolide (IX) is isolated from the reaction mixture by conventional procedures such as extraction with water-immiscible solvents, for example, ether, methylene dichloride, ethylene dichloride, chloroform, carbon tetrachloride, and the like, and recrystallization from suitable organic solvents such as ethyl acetate, acetone, Skellysolve B hexanes, methanol and mixtures of such solvents, and the like.

The thus-obtained bromohydrine compound, 3β-acyloxy-15β-hydroxy-14α-bromo-14α-card-20(22) - enolide is converted to the corresponding 14,15-oxido compound (Xb) by reacting 3β-acetoxy-15β-hydroxy-14α-bromo-14α-card-20(22)-enolide with a base such as potassium acetate, sodium acetate, soda lime, or basic hydroxides such as hydroxides of sodium, potassium, calcium, barium, and the like. The reaction is usually carried out in an organic solvent. If the selected condensation reagent is strongly basic such as sodium or potassium hydroxide the solvent must be of such a nature as not to undergo basic condensation, for example, dioxane, tertiary butyl alcohol, and the like. If weaker bases, potassium acetate or sodium acetate, are selected, then acetone, ethyl alcohol, ethyl acetate, or even chlorinated hydrocarbons may be used. Preferably the reaction is carried out at the reflux temperature of the solvent. At the end of the reaction period the reaction mixture is suitably poured into excess of water, the resulting precipitate collected on filter, and the material purified by recrystallization from solvents, for example, acetone, methanol or Skellysolve B hexanes to give pure 3β-acyloxy-14,15-oxido-20(22)-cardenolide (Xb).

The thus-obtained 3β-acyloxy-14(15)-oxido-20(22)-cardenolide (Xb) is hydrolyzed to the corresponding 3-alcohol (Xa) by using a fungus selected from the genus Rhizopus, suitably Rhizopus shanghaiensis (ATCC 10329) in an anaerobic short term fermentation, with medium and conditions of agitation as described in U.S. Patent 2,602,769 and more specifically in the example of the instant application. After the fermentation the thus-produced 3β-hydroxy-14(15)-oxido-20(22)-cardenolide (Xa) is separated and isolated from the fermentation medium by conventional means, such as extraction, recrystallization, chromatography or combinations thereof as described in detail in the example.

The thus-obtained 3β-hydroxy-14(15)-oxido-20(22)-cardenolide (Xa) is thereafter reduced with a metallic hydride, such as sodium or potassium borohydride. The reduction is generally carried out at a temperature between zero and 30 degrees centigrade in dioxane, tetrahydrofuran or other solvent solutions. The lower temperature range between zero and ten degrees is preferred and in this case the time of reaction will be between two and ten hours with a period from four to six hours preferred. Thereafter the reaction product is isolated in conventional manner usually by first acidifying the solution with dilute acid, concentrating the thus obtained acidic reaction mixture to a small volume, diluting with excess water and extracting with a water immiscible solvent such as chloroform, Skellysolve B hexanes, carbon tetrachloride, methylene dichloride, and the like. After the solvent is removed from the extract a solid residue is obtained which consisted of two major components digitoxigenin [3β,14β-dihydroxy-20(22)-cardenolide] and its 15β-hydroxy isomer which were separated by chromatography.

The following examples are illustrative of the process of the present invention and are not to be construed as limiting.

PREPARATION 1

15α-hydroxyprogesterone

A medium was prepared having a composition of fifty grams of Cerelose dextrose, three grams of tartaric acid, three grams of ammonium nitrate, 0.4 gram of dibasic ammonium phosphate, 0.4 gram of potassium carbonate, 0.3 gram of magnesium carbonate, 0.3 gram of diammonium sulfate, 0.2 gram of zinc sulfate, 0.05 gram of ferrous sulfate, and one gram of sodium acetate diluted to one liter with industrial tap water. Twelve liters of this heat-sterilized medium was inoculated with spores of *Penicillium urticae*, ATCC 10120. Into this, there was dispersed a solution of three grams of progesterone in 150 milliliters of acetone. Fermentation proceeded at room temperature for 48 hours with agitation and aeration at a rate of one liter per minute. The whole beer containing mycelium was extracted four times, each time with three liters of methylene chloride. The combined methylene chloride extract was washed twice, each time with one-tenth by volume portions of a two percent aqueous solution of sodium bicarbonate and then twice with one-tenth by volume portions of water. The methylene chloride extract was dried with anhydrous sodium sulfate and then freed of solvent on a steam bath. The residue was dissolved in 300 milliliters of benzene and chromatographed over 150 grams of alumina (hydrochloric acid washed, water washed, and dried at 120 degrees centigrade for four hours) using 300-milliliter portions of developing solvent as indicated in Table I.

Fractions 19 and 20 were combined and dissolved in methylene dichloride, mixed with a small proportion of Magnesol magnesium silicate and filtered. The filtrate was concentrated to five milliliters and then mixed with fifty milliliters of ether to give 746 milligrams of a crystalline precipitate. Recrystallized from 25 milliliters of ethyl acetate and then from five milliliters of methylene chloride by the addition of fifty milliliters of ether produced 572 milligrams of crystals melting at 223 to 230 degrees centigrade. Two further recrystallizations from methylene dichloride ether yielded 302 milligrams of 15α-hydroxyprogesterone having a melting point of 230 to 234 degrees centigrade, $[\alpha]_D^{21}$ —224 degrees (C. 1.0 in chloroform), $$\lambda_{max}^{alc.} \; 242; \; E = 16,400$$

*Analysis.*—Calculated for $C_{21}H_{30}O_3$: C, 76.32; H, 9.15. Found: C, 76.79; H, 9.49.

The infrared spectrum confirmed the structure.

TABLE I

| Fraction | Solvent | Eluate Solids, Milligrams |
|---|---|---|
| 1 | benzene | 98 |
| 2 | do | 35 |
| 3 | benzene-ether 20:1 | 24 |
| 4 | do | 54 |
| 5 | benzene-ether 10:1 | 123.5 |
| 6 | do | 177 |
| 7 | benzene-ether 1:1 | 206 |
| 8 | do | 245 |
| 9 | ether | 191 |
| 10 | do | 142 |
| 11 | ether-chloroform 20:1 | 68 |
| 12 | do | 64 |
| 13 | ether-chloroform 10:1 | 13 |
| 14 | do | 12 |
| 15 | ether-chloroform 1:1 | 17 |
| 16 | do | 71 |
| 17 | do | 104 |
| 18 | do | 93 |
| 19 | chloroform | 42 |
| 20 | do | 632 |
| 21 | do | 301 |
| 22 | do | 84 |
| 23 | chloroform-acetone 21:1 | 42 |
| 24 | acetone | 51 |
| 25–27 | methanol | 181 |

PREPARATION 2

15-acetoxyprogesterone

A mixture of 100 milligrams of 15-hydroxyprogesterone, one milliliter of acetic anhydride and one milliliter of pyridine was maintained at room temperature for 24 hours. It was then quenched with 100 milliliters of ice water and extracted with chloroform. The chloroform extracts were washed twice with five percent hydrochloric acid, twice with five percent sodium carbonate and three times with water. Evaporation of the washed extract gave 105 milligrams of oily residue which was crystallized from ethyl acetate and recrystallized from methanol to yield 80.5 milligrams of 15-acetoxyprogesterone having a melting point of 181 to 183 degrees centigrade. Structure was confirmed by infrared spectrum; λ maximum in alcohol of 241 millimicrons, E of 16,800; and an optical rotation $[\alpha]_D^{23}$ of plus 178 degrees at a concentration of 1.0 in chloroform.

PREPARATION 3

15α-formyloxyprogesterone

In the same manner as Preparation 2, using an excess of formic acid in place of acetic anhydride produced 15-formyloxyprogesterone.

PREPARATION 4

15α-benzoxyprogesterone

In the same manner as in Preparation 2, using benzoyl chloride in place of acetic anhydride, produced 15α-benzoyloxyprogesterone.

In a similar manner other esters of 15α-hydroxyprogesterone are prepared according to the acylation procedure illustrated above or by reactions with ketene, ketenes of selected acids, selected acids, acid anhydrides or acid halides such as acid chlorides and acid bromides in an organic solvent such as pyridine, or the like. Representative of such 15α-acyloxyprogesterones are the acylates of 15-hydroxyprogesterone of hydrocarbon carboxylic acid esters of saturated or unsaturated aliphatic, carboxylic or cycloaliphatic, arylalkyl, alkaryl, mono- or dipolycarboxylic acids having between one to eight carbon atoms, inclusive, such as, for example, the propionyloxy, butyryloxy, isobutyryloxy, valeryloxy, isovaleryloxy, hexanoyloxy, heptanoyloxy, octanoyloxy, benzoyloxy, phenylacetoxy, toluyloxy, β-cyclopentylpropionyloxy, acrylyloxy, hemisuccinyloxy, hemimaleyloxy, hemitartaryloxy, dihydrogencitryloxy, dimethyl- and trimethylacetoxy, or the like. The acids may also contain non-interfering substituents such as mono, or poly halo, chloro, bromo, hydroxy, methoxy, and the like groups if so desired.

EXAMPLE 1

4,14-pregnadiene-3,20-dione from 15α-acetoxyprogesterone

One gram of 15α-acetoxyprogesterone was placed in a tube ten centimeters long and pyrolyzed in a combustion furnace heated to 300 degrees centigrade. The compound was distilled in a nitrogen stream through the tube. The oily distillate was thereupon taken up in chloroform, washed twice with five percent sodium carbonate solution and three times with water. The chloroform solution was then dried with anhydrous sodium sulfate and the solvent removed. Thereupon 854 milligrams of an oily residue was obtained. This residue was dissolved in 200 milliliters of Skellysolve B hexane hydrocarbons and chromatographed over 40 grams of alumina. Fractions of 200 milliliters were collected as shown in Table II.

Eluate fractions 7 through 10 were combined and recrystallized three times from ethanol to give 350 milligrams of 4,14-pregnadiene-3,20-dione of melting point 144 to 147 degrees centigrade and rotation $[\alpha]_D$ +128 degrees.

*Analysis.*—Calculated for $C_{21}H_{28}O_2$: C, 80.73; H, 9.03. Found: C, 80.58; H, 8.99.

TABLE II

| Fraction | Solvent | Eluate Solids, Milligrams |
|---|---|---|
| 1 | Skellysolve B (petroleum ether) | |
| 2 | do | |
| 3 | do | 3.0 |
| 4 | Skellysolve B-benzene 1:1 | 14.0 |
| 5 | do | 6.0 |
| 6 | do | 15.0 |
| 7 | Benzene | 117.5 |
| 8 | do | 123.0 |
| 9 | do | 85.5 |
| 10 | Benzene—10% ether | 214.0 |
| 11 | do | 52.5 |
| 12 | do | 6.0 |
| 13 | Benzene—30% ether | |

EXAMPLE 2

4,14-pregnadiene-3,20 dione from 15α-propionyloxyprogesterone

In the same manner as given in Example 1, 15α-propionyloxyprogesterone instead of the 15α-acetoxyprogesterone was pyrolyzed at a temperature of 350 degrees centigrade to yield 4,14-pregnadiene-3,20-dione.

EXAMPLE 3

4,14-pregnadiene-3,20-dione from 15α-benzoyloxyprogesterone

In the same manner as given in Example 1, using 15α-benzoyloxyprogesterone, instead of 15α-acetoxyprogesterone, produced 4,14-pregnadiene-3,20-dione.

In the same manner as shown in Examples 1 through 3, other 15α-acyloxyprogesterones, such as previously described, can be pyrolyzed at temperatures between 275 and 400 degrees centigrade to produce 4,14-pregnadiene-3,20-dione.

EXAMPLE 4

4,14-pregnadiene-3,20-dione from 14α-hydroxyprogesterone

Three grams of 14α-hydroxyprogesterone was dissolved in 50 milliliters of acetic anhydride. To this solution there was added 4.5 grams of freshly fused potassium acid sulfate. The mixture was heated on the steam bath for thirty minutes, then cooled with ice. The cooled solution was diluted with 300 milliliters of ice water and maintained overnight. The aqueous solution was then extracted with chloroform four times. Chloroform extracts were washed three times with a five percent sodium carbonate solution and four times with water. Upon concentration of the chloroform extracts, 2.7 grams of a waxy residue was obtained.

The residue was dissolved in 150 milliliters of Skellysolve B hexane hydrocarbon and purified by chromatography over 135 grams of alumina. Fractions of 150 milliliters were collected as shown in Table III.

TABLE III

| Fraction | Solvent | Eluate Solids, Milligrams |
|---|---|---|
| 1 | Skellysolve B | |
| 2 | Skellysolve B—70% benzene | |
| 3 | Benzene | 5.0 |
| 4 | Benzene—30% ether | 27.5 |
| 5 | Benzene—50% ether | 35.0 |
| 6 | do | 51.5 |
| 7 | Ether | 53.0 |
| 8 | do | 67.0 |
| 9 | Ether—10% chloroform | 45.0 |
| 10 | do | 77.0 |
| 11 | Ether—20% chloroform | 80.5 |
| 12 | do | 71.0 |
| 13 | Ether—30% chloroform | 107.0 |
| 14 | do | 168.5 |
| 15 | Ether—50% chloroform | 119.5 |
| 16 | do | 137.0 |
| 17 | Chloroform | 141.0 |
| 18 | Acetone | 905.0 |
| 19 | Methanol | 119.5 |

Fractions 13 through 16 were combined, a total of 532 milligrams, recrystallized from ethyl acetate, sublimed at 0.05 millimeter pressure and at 135 degrees centigrade, and recrystallized once more from methanol to give 291.5 milligrams of 4,14-pregnadiene-3,20-dione of melting point 144 to 146 degrees centigrade.

EXAMPLE 5

*21-hydroxy-4,14-pregnadiene-3,20-dione*

Eight liters of a medium were prepared containing per liter 30 grams of malt extract, 50 grams of Cerelose dextrose, two grams of dihydrogen potassium phosphate, 0.5 gram of magnesium sulfate heptahydrate, and 0.03 gram of zinc sulfate heptahydrate. Eight liters of this heat sterilized medium were inoculated with *Ophiobolus herpotrichus* and grown for a period of 24 hours at a rate of aeration equal to one liter per minute and a rate of agitation of 200 r.p.m. To this fermentation mixture containing a 24-hour growth of *Ophiobolus herpotrichus*, two grams of 4,14-pregnadiene-3,20 dione dissolved in acetone was added. After an incubation period of 48 hours at a temperature between 26 and 30 degrees, the reaction mixture was extracted with methylene dichloride to give 3.55 grams of an oily extractive which crystallized upon trituration with ether. The steroid compound was recovered after a three-fold trituration of the extractives and decantation of the ether mother liquors. Thus, 1.2 grams of 21-hydroxy-4,14-pregnadiene-3,20-dione of melting point 182 to 184 degrees centigrade was obtained.

EXAMPLE 6

*21-acetoxy-4,14-pregnadiene-3,20-dione*

One hundred milligrams of 21-hydroxy-4,14-pregnadiene-3,20-dione was dissolved in two milliliters of absolute pyridine and one milliliter of acetic anhydride. The mixture was maintained for a period of two hours, then diluted with water, and chilled, and the resulting precipitate was collected on a filter. The crystals were redissolved in two milliliters of acetone and precipitated from acetone by the addition of hexane to the acetone solution. The thus-obtained recrystallized 21-acetoxy-4,14-pregnadiene-3,20-dione had a melting point of 142 degrees centigrade.

EXAMPLE 7

*21-propionyloxy-4,14-pregnadiene-3,20-dione*

In the same manner as given in Example 6, using the equivalent proportion of propionic anhydride in place of acetic anhydride produced 21-propionyloxy-4,14-pregnadiene-3,20-dione.

EXAMPLE 8

*21-benzoyloxy-4,14-pregnadiene-3,20-dione*

In the same manner as given in Example 6, using the equivalent proportion of benzoyl chloride in place of acetic anhydride produced 21-benzoyloxy-4,14-pregnadiene-3,20-dione.

In a similar manner as given in Examples 6 thru 8, other esters of 21-hydroxy-4,14-pregnadiene-3,20-dione are prepared by reacting 21-hydroxy-4,14-pregnadiene-3,20-dione with the selected acid anhydride, ketene, ketene of a selected acid or with a selected acid halide in pyridine or with other acylating agents as previously described in this specification. Representative esters of 21-hydroxy-4,14-pregnadiene-3,20 dione include the 21-acyloxy: formyloxy-, butyryloxy-, isobutyryloxy-, valeryloxy-, isovaleryloxy-, hexanoyloxy-, heptanoyloxy-, octanoyloxy-, benzoyloxy-, (β-cyclopentylpropionyloxy)-, dimethylacetoxy-, trimethylacetoxy-, phenylacetoxy-, toluyloxy-, anisoyloxy-, gallyloxy-, saliscyloyloxy-, cinnamyloxy-, hemisuccinyloxy-, hemitartaryloxy-, dihydrogencitryloxy-, maleyloxy-, fumaryloxy-, crotonyloxy-, acrylyloxy-, (β-methylcrotonyloxy)-, cyclohexane-carbonyloxy-, chloroacetoxy-, dichloroacetoxy-, trichloroacetoxy-, bromoacetoxy-, hemiquinolinoyloxy-, nicotinyloxy-, piperonyloxy-, (2-furoyloxy)-, thioglycollyloxy-, (para-chlorobenzoyloxy)-, (para-bromobenzoyloxy)-, (meta-nitrobenzoyloxy)-, (3,5-dinitrobenzoyloxy)-4,14-pregnadiene-3,20-dione, and the like.

EXAMPLE 9

*21-hydroxy-14-pregnene-3,20-dione*

A palladium zinc carbonate zinc oxide catalyst was prepared as follows: eleven grams of anhydrous zinc chloride was dissolved in 100 milliliters of water at seventy degrees centigrade, and a twenty percent aqueous solution of sodium carbonate was added in excess, with constant stirring, to form a precipitate of zinc carbonate. The precipitate was filtered, washed free of alkali with warm water, and resuspended in 100 milliliters of water to form a slurry. To this aqueous slurry was added five milliliters of a palladium chloride solution containing 0.5 gram of palladium, and then one milliliter of 37 percent aqueous formaldehyde solution. The resulting red-brown colored mixture was warmed on a steam bath to about sixty degrees centigrade and a thirty percent aqueous solution of sodium hydroxide then added dropwise, with continual stirring, until the pH of the mixture reached nine, at which point palladium precipitated. The black-colored precipitate was washed by decantation with ten successive fifty-milliliter portions of water and then filtered under suction. The precipitate on the filter funnel was washed six times, dried by suction, and heated in an oven at 210 degrees centigrade for a period of eleven hours. Six and eight-tenths grams of a brown colored catalyst consisting of palladium supported on a zinc carbonate-zinc oxide mixture was obtained.

1.5 grams of this catalyst was introduced into ten milliliters of methanol and the mixture hydrogenated for a period of one hour. To this solution was then added 1.5 grams of 21-hydroxy-4,14-pregnadiene-3,20-dione, dissolved in 100 milliliters of methanol. This reaction mixture took up 1.1 moles of hydrogen within 15 minutes. The reaction was interrupted and the solution was filtered and the filtrate put through a column of activated carbon and diatomaceous earth 1:1 (60 grams). The desired product was recovered by elution with nine fractions of 300-milliliters of acetone to give 1.25 grams of crystals of melting point 155 to 157.

EXAMPLE 10

*21-acetoxy-14-pregnene-3,20-dione*

To a solution of 80 milligrams of 21-hydroxy-14-pregnene-3,20 dione in 1.5 milliliters of pyridine was added one milliliter of acetic anhydride and the mixture allowed to stand for a period of three hours. Thereafter the reaction mixture was diluted with fifty milliliters of ice water and the resulting aqueous solution filtered, obtaining in this manner crystals of 21-acetoxy-14-pregnene-3,20-dione which were recrystallized from methanol to give pure 21-acetoxy-14-pregnene-3,20-dione of melting point 154 to 157.

EXAMPLE 11

*21-(β-cyclopentylpropionyloxy)-14-pregnene-3,20-dione*

In the same manner as given in Example 10, using the equivalent proportion of (β-cyclopentylpropionyl chloride) in place of acetic anhydride produced 21-(β-cyclopentylpropionyloxy)-14-pregnene-3,20-dione.

EXAMPLE 12

*21-butyryloxy-14-pregnene-3,20-dione*

In the same manner as given in Example 10, using the equivalent proportion of butyric anhydride in place of acetic anhydride produced 21-butyryloxy-14-pregnene-3,20-dione.

EXAMPLE 13
*21-hexanoyloxy-14-pregnene-3,20-dione*

In the same manner as given in Example 10, using the equivalent proportion of hexanoic acid anhydride in place of acetic anhydride produced 21-hexanoyloxy-14-pregnene-3,20-dione.

EXAMPLE 14
*21-benzoyloxy-14-pregnene-3,20-dione*

In the same manner as given in Example 9, hydrogenating 21-benzoyloxy-4,14-pregnadiene-3,20-dione instead of 21-hydroxy-14-pregnene-3,20 dione with hydrogen in the presence of a palladium-zinc oxide catalyst prepared as described before yields 21-benzoyloxy-14-pregnene-3,20-dione.

EXAMPLE 15
*21-propionyloxy-14-pregnene-3,20-dione*

In the same manner as given in Example 9, hydrogenating 21-propionyloxy-4,14-pregnadiene-3,20-dione instead of 21-hydroxy-14-pregnene-3,20-dione with hydrogen in the presence of a palladium-zinc oxide-zinc carbonate catalyst yields 21-propionyloxy-14-pregnene-3,20-dione.

EXAMPLE 16
*21-toluyloxy-14-pregnene-3,20-dione*

In the same manner as given in Example 9, hydrogenating 21-toluyloxy-4,14-pregnadiene-3,20 dione instead of 21-hydroxy-14-pregnene-3,20-dione with hydrogen in the presence of palladium-zinc oxide-zinc carbonate catalyst prepared as described before yields 21-toluyloxy-14-pregnene-3,20-dione.

EXAMPLE 17
*21-anisoyloxy-14-pregnene-3,20-dione*

In the same manner as given in Example 9, hydrogenating 21-anisoyloxy-4,14-pregnadiene-3,20-dione instead of 21-hydroxy-14-pregnene-3,20-dione with hydrogen in the presence of a palladium-zinc oxide-zinc carbonate catalyst yields 21-anisoyloxy-14-pregnene-3,20-dione.

In a manner similar to Examples 10 through 13, by reacting 21-hydroxy-14-pregnene-3,20-dione with the selected anhydride, ketene, ketene of a selected acid or selected acid halide in pyridine or with other acylating agents and solvents as previously described, or by hydrogenation of the corresponding 21-acyloxy-4,14-pregnadiene-3,20-dione (Examples 6–8) as described in Examples 14 thru 17, the corresponding 21-acyloxy-14-pregnene-3,20-diones are obtained.

EXAMPLE 18
*21-acetoxy-3α-hydroxy-14-pregnen-20-one*

A solution of 1.2 grams of 21-acetoxy-14-pregnene-3,20-dione, dissolved in 7.5 milliliters of dioxane, redistilled over lithium aluminum hydride, was cooled to a temperature of ten degrees centigrade. To this solution was added, under vigorous stirring, 38.9 milligrams of sodium borohydride, dissolved in 0.6 milliliter of 0.1 normal sodium hydroxide solution. At the same time 6.0 milliliters of cold, deionized water was added. After a reaction time of fifteen minutes at a temperature of twenty degrees centigrade, the reaction mixture was neutralized with dilute hydrochloric acid and extracted with methylene dichloride. The methylene extracts were purified by chromatography over Florisil anhydrous magnesium silicate and recrystallized to give 677 milligrams of 21-acetoxy-3α-hydroxy-14-pregnene-3,20-dione of melting point 198 degrees centigrade.

EXAMPLE 19
*21-benzoyloxy-3α-hydroxy-14-pregnen-20-one*

In the same manner as given in Example 18, reducing 21-benzoyloxy-14-pregnene-3,20-dione with potassium borohydride yielded 21-benzoyloxy-3α-hydroxy-14-pregnene-3,20-dione.

EXAMPLE 20
*21-propionyloxy-3α-hydroxy-14-pregnen-20-one*

In the same manner as given in Example 18, reducing 21-propionyloxy-14-pregnene-3,20-dione with potassium borohydride yielded 21-propionyloxy-3α-hydroxy-14-pregnene-3,20-dione.

EXAMPLE 21
*21-(β-cyclopentylpropionyloxy)-3α-hydroxy-14-pregnen-20-one*

In the same manner as given in Example 18, reducing 21-propionyloxy-14-pregnene-3,20-dione with sodium borohydride yielded 21-propionyloxy-3α-hydroxy-14-pregnene-3,20-dione.

EXAMPLE 22
*21-toluyloxy-3α-hydroxy-14-pregnen-20-one*

In the same manner as given in Example 18, reducing 21-toluyloxy-14-pregnene-3,20-dione with sodium borohydride yielded 21-toluyloxy-3α-hydroxy-14-pregnene-3,20-dione.

In a manner similar to Examples 18 through 22, using the starting materials of Examples 10 through 17 with sodium or potassium borohydride is productive of the corresponding 21-acyloxy-3α-hydroxy-14-pregnen-20-ones.

EXAMPLE 23
*3α,21-diacetoxy-14-pregnen-20-one*

To a solution of 50 milligrams of 21-acetoxy-3α-hydroxy-14-pregnen-20-one in one milliliter of pyridine was added 0.5 milliliter of acetic anhydride. The solution was maintained for a period of six hours, poured into twenty milliliters of ice water, chilled in a refrigerator at plus five degrees centigrade for a period of fifteen hours, thereafter filtered and the obtained crystals recrystallized from a mixture of acetone and methanol. The thus obtained 3α,21-diacetoxy-14-pregnen-20-one had a melting point of 205 to 207 degrees centigrade.

In a manner similar to Example 23 by esterifying 21-acyloxy-3α-hydroxy-14-pregnen-20-ones with selected acid anhydrides or acid halides, other representative 3α,21-diacyloxy-14-pregnen-20-ones are obtained wherein the acyloxy group of the 3α and the 21-position may be the same or dissimilar. Illustratively, other 3α,21-diacyloxy-14-pregnen-20-ones include: 3α,21-dipropionyloxy-, 3α,21-dibutyryloxy-, 3α,21-divaleryloxy-, 3α,21-dihexanoyloxy-, 3α,21-dibenzoyloxy-, 3α,21-diphenylacetoxy-, 3α-acetoxy-21-benzoyloxy-, 3α-acetoxy-21-cinnamyloxy-, 3α-acetoxy-21-salicyloyloxy-, 3α-propionyloxy-21-acetoxy-, 3α-butyryloxy-21-benzoyloxy-, 3α-hexanoyloxy-21-phenylacetoxy-14-pregnen-20-one, and the like.

EXAMPLE 24
*3α,21-dihydroxy-14-pregnen-20-one*

To a solution of fifty milligrams of 21-acetoxy-3α-hydroxy-14-pregnen-20-one in two milliliters of ethyl alcohol was added fifty milligrams of sodium bicarbonate. The mixture was refluxed in a nitrogen atmosphere for a period of 48 hours, filtered through filter paper, and poured into twenty milliliters of ice water. The oily residue was recrystallized from acetone and Skellysolve B hexane hydrocarbons to give 3α,21-dihydroxy-14-pregnen-20-one.

In a manner similar to Example 24 other 21-acyloxy-3α-hydroxy-14-pregnen-20-ones and 3α,21-diacyloxy-14-pregnen-20-ones like those shown in Examples 19–23 are hydrolyzed to give 3α,21-dihydroxy-14-pregnen-20-one.

EXAMPLE 25

*21-acetoxy-3α-(para-toluenesulfonyloxy)-14-pregnen-20-one*

To a solution of 2.1 grams of 21-acetoxy-3α-hydroxy-14-pregnen-20-one in 25 milliliters of dry pyridine was added 1.5 grams of para-toluenesulfonyl chloride. After maintaining at room temperature for a period of fifteen hours the solution was diluted with 300 milliliters of water. The precipitate thus obtained was separated by filtration, washed with water several times, and recrystallized three times with ethyl acetate-chloroform 1:1 to give 1.95 grams of 21-acetoxy-3α-(para-toluenesulfonyloxy)-14-pregnen-20-one of melting point 212 to 215 degrees centigrade.

EXAMPLE 26

*21-benzoyloxy-3α-(para-toluenesulfonyloxy)-14-pregnen-20-one*

In the manner given in Example 25, 21-benezoyloxy-3α-hydroxy-14-pregnen-20-one was reacted with para-toluenesulfonyl chloride to produce 21-benzoyloxy-3α-(para-toluenesulfonyloxy)-14-pregnen-20-one.

EXAMPLE 27

*21-benzoyloxy-3α-benzenesulfonyloxy-14-pregnen-20-one*

In the same manner as given in Example 25, 21-benzoyloxy-3α-hydroxy-14-pregnen-20-one is reacted with benzenesulfonyl chloride to produce 21-benzoyloxy-3α-benzenesulfonyloxy-14-pregnen-20-one.

EXAMPLE 28

*21 - propionyloxy - 3α - (para - chlorobenzenesulfonyloxy)-14-pregnen-20-one*

In the same manner as given in Example 25, 21-propionyloxy-3α-hydroxy-14-pregnen-20-one was treated with para-chlorobenzenesulfonyl bromide to give 21-propionyloxy - 3α - (parachlorobenzenesulfonyloxy) - 14 - pregnen-20-one.

EXAMPLE 29

*21 - toluyloxy - 3α - (para - bromobenzenesulfonyloxy)-14-pregnen-20-one*

In the same manner as given in Example 25, 21-toluyloxy-3α-hydroxy-14-pregnen-20-one was treated with para-bromobenzenesulfonyl bromide to give 21-toluyloxy-3α - (para - bromobenzenesulfonyloxy) - 14 - pregnen-20-one.

EXAMPLE 30

*21 - butyryloxy - 3α - (β - naphthylsulfonyloxy) - 14-pregnen-20-one*

In the same manner as given in Example 25, 21-butyryloxy-3α-hydroxy-14-pregnen-20-one was treated with β-naphthylsulfonyl bromide to give 21-butyryloxy-3α-(β-naphthylsulfonyloxy)-14-pregnen-20-one.

EXAMPLE 31

*21 - propionyloxy - 3α - (para - toluenesulfonyloxy) - 14-pregnen-20-one*

In the same manner as given in Example 25, 21-propionyloxy-3α-hydroxy-14-pregnen-20-one was treated with paratoluenesulfonyloxy)-14-pregnen-20-one.

In the manner shown in Examples 25 through 31, other 21-acyloxy-3α-hydroxy-14-pregnen-20-ones may be treated with arylsulfonyl halides to give the corresponding 21-acyloxy-3α-(arylsulfonyloxy)-14-pregnen-20-ones such as illustratively: 21-isobutyryloxy-3α-(para-nitrobenzensulfonyloxy) - 14 - pregnen - 20 - one, 21 - valeryloxy- 3α - (para - bromobenzenesulfonyloxy) - 14 - pregnen-20 - one, 21 - hexanoyloxy - 3α - (para - toluenesulfonyloxy) - 14 - pregnen - 20 - one, 21 - toluyloxy - 3α-(β-naphthylsulfonyloxy)-14-pregnen-20-one, and the like.

EXAMPLE 32

*3β,21-diacetoxy-14-pregnen-20-one*

A solution of 1.55 grams of 21-acetoxy-3α-(para-toluenesulfonyloxy)-14-pregnen-20-one, 1.5 grams of anhydrous sodium acetate and fifty milliliters of glacial acetic acid were refluxed for a period of two hours at atmospheric pressure. Thereafter the solution was concentrated in an air stream, and the residue after dispersion in water, extracted with chloroform. The chloroform extracts were washed three times with five percent sodium hydroxide and three times with water. The residual extractives, 1.60 grams, were purified by chromatography over 75 grams of hydrochloric acid washed alumina. Ether-five percent chloroform eluted 755 milligrams of 21-acetoxy-3,14-pregnadien-20-one and ether-fifty percent chloroform and chloroform eluted 805 milligrams of 3β,21-diacetoxy-14-pregnen-20-one which was recrystallized twice from ethanol to give a melting point of 178 to 180 degrees centigrade.

EXAMPLE 33

*3β-acetoxy-21-propionyloxy-14-pregnen-20-one*

In the same manner as given in Example 32, 21-propionyloxy - 3α - (para - toluenesulfonyloxy) - 14 - pregnen-20-one was refluxed in glacial acetic acid in the presence of anhydrous potassium acetate to give 3β-acetoxy-21-propionyloxy-14-pregnen-20-one.

EXAMPLE 34

*3β-butyryloxy-21-propionyloxy-14-pregnen-20-one*

In the same manner as given in Example 32, 21-propionyloxy - 3α - (para - chlorobenzenesulfonyloxy)-14-pregnen-20-one was treated with butyric acid and potassium butyrate to give 3β-butyryloxy-21-propionyloxy-14-pregnen-20-one.

EXAMPLE 35

*3β-propionyloxy-21-benzoyloxy-14-pregnen-20-one*

In the same manner as given in Example 32, 21-benzoyloxy-3α-benzenesulfonyloxy-14-pregnen-20-one is refluxed in propionic anhydride in the presence of sodium propionate to give 3β-propionyloxy-21-benzoyloxy-14-pregnen-20-one.

EXAMPLE 36

*3β-valeryloxy-21-toluyloxy-14-pregnen-20-one*

In the same manner as given in Example 32, 21-toluyloxy - 3α - (para - bromobenzenesulfonyloxy) - 14-pregnen-20-one is refluxed in valeric anhydride in the presence of potassium valerate to give 3β-valeryloxy-21-toluyloxy-14-pregnen-20-one.

EXAMPLE 37

*3β-acetoxy-21-butyryloxy-14-pregnen-20-one*

In the same manner as given in Example 32, 21-butyryloxy - 3α - (β - naphthylsulfonyloxy) - 14 - pregnen-20-one is refluxed in acetic anhydride in the presence of sodium acetate to give 3β-acetoxy-21-butyryloxy-14-pregnen-20-one.

In the same manner as shown in Examples 32 through 37, other 3β,21-diacyloxy-14-pregnen-20-ones may be prepared by heating the corresponding 21-acyloxy-3α-arylsulfonyloxy-14-pregnen-20-one in a selected hydrocarbon carboxylic acid in the presence of an alkali-metal salt of the same acid. Representative 3β,21-diacyloxy-14-pregnen-20-one thus obtained include: 3β-acetoxy-21-valeryloxy - 14 - pregnen - 20 - one, 3β - acetoxy - 21 - hexanoyloxy - 14 - pregnen - 20 - one, 3β - acetoxy - 21-heptanoyloxy - 14 - pregnen - 20 - one, 3β - acetoxy-21 - octanoyloxy - 14 - pregnen - 20 - one, 3β - acetoxy-21 - (β - cyclopentylpropionyloxy) - 14 - pregnen - 20-one, 3β - propionyloxy - 21 - cinnamyloxy - 14 - pregnen - 20 - one, 3β - butyryloxy - 21 - anisoyloxy - 14-pregnen - 20 - one, 3β - valeryloxy - 21 - galloyloxy - 14- pregnen - 20 - one, 3β - hexanoyloxy - 21 - hemisuccinyloxy-14-pregnen-20-one, and the like.

EXAMPLE 38

*3β,21-dihydroxy-14-pregnen-20-one*

To a solution of 500 milligrams of 3β,21-diacetoxy-14-pregnen-20-one in seven milliliters of methanol and three milliliters of water was added 500 milligrams of sodium carbonate. The reaction mixture was allowed to stand at room temperature, twenty to thirty degrees centigrade, for a period of 24 hours. Thereafter the mixture was diluted in fifty milliliters of water and the thus obtained precipitate was recrystallized from ethyl acetate to give crystals of 3β,21-dihydroxy-14-pregnen-20-one.

EXAMPLE 39

*3β,21-diacetoxy-15β-hydroxy-14α-bromopregnan-20-one*

A solution of 2.5 grams of 3β,21-diacetoxy-14-pregnen-20-one in 100 milliliters of methylene dichloride and 200 milliliters of tertiarybutyl alcohol was prepared by vigorous stirring at room temperature. To this solution was added 6.5 milliliters of seventy percent perchloric acid, dissolved in fifty milliliters of water, and 1.1 grams of N-bromoacetamide, dissolved in 12 milliliters of tertiary butyl alcohol. The mixture was stirred for a period of ten minutes at a temperature of twenty-five degrees centigrade. Thereafter 1.2 grams of sodium sulfite, dissolved in sixty milliliters of water, was added. The solution was then concentrated to one third of the original volume in vacuo and poured thereafter into 300 milliliters of ice with stirring. The precipitate which separated was collected by filtration and dried in vacuo to give 2.45 grams of crude 3β,21-diacetoxy-15β-hydroxy-14α-dibromopregnene-20-one which was twice recrystallized from methyl alcohol.

EXAMPLE 40

*3β-acetoxy-21-propionyloxy-15β-hydroxy-14α-bromopregnan-20-one*

In the manner given in Example 39, 3β-acetoxy-21-propionyloxy-14-pregnen-20-one, dissolved in methylene dichloride and tertiary butyl alcohol, was treated with an acidified solution of N-bromosuccinimide to yield 3β-acetoxy - 21 -propionyloxy - 15β - hydroxy - 14α - bromopregnen-20-one.

EXAMPLE 41

*3β-propionyloxy-21-benzoloxy-15β-hydroxy-14α-bromopregnan-20-one*

In the manner given in Example 39, 3β-propionyloxy-21-benzoyloxy-14-pregnen-20-one, dissolved in chloroform and tertiary butyl alcohol, was treated with N-bromoacetamide acidified with dilute sulfuric acid to yield 3β - propionyloxy - 21 -benzoyloxy - 15β - hydroxy - 14α-bromopregnen-20-one.

EXAMPLE 42

*3β-valeryloxy-21-toluyloxy-15β-hydroxy-14α-bromopregnan-20-one*

In the manner given in Example 39, 3β-veleryloxy-21-toluyloxy-14-pregnen-20-one, dissolved in methylene dichloride and tertiary butyl alcohol was treated with N-bromoacetamide acidified with perchloric acid to yield 3β-valeryloxy - 21 - toluyloxy - 15β - hydroxy - 14α - bromopregnan-20-one.

EXAMPLE 43

*3β,21-diacetoxy-15β-hydroxy-14α-chloropregnan-20-one*

In the manner given in Example 39, 3β,21-diacetoxy-14-pregnen-20-one, dissolved in tertiary butyl alcohol, was treated with N-chlorosuccinimide acidified with dilute sulfuric acid to yield 3β,21-diacetoxy-15β-hydroxy-14α-chloropregnan-20-one.

In the same manner as shown in Examples 39 through 43, other corresponding 3β,21-diacyloxy-15β-hydroxy-14α-halopregnen-20-one are prepared by reacting the corresponding 3β,21-diacyloxy-14-pregnen-20-one illustrated by Examples 32–37 with hypobromous acid (HOBr) or hypochlorous acid the hypobromous acid preferably prepared in situ.

EXAMPLE 44

*3β,21-dihydroxy-15β-hydroxy-14α-bromopregnan-20-one*

A mixture of 100 milligrams of 3β,21-diacetoxy-15β-hydroxy-14α-bromopregnan-20-one, five milliliters of methanol, one milliliter of water and 100 milligrams of sodium carbonate was heated for a period of thirty minutes, allowed to cool, and thereafter poured into twenty-five milliliters of water. The precipitate, an oily residue, was separated from the water layer, redissolved in acetone and twice recrystallized from acetone solution to give pure 3β,21 - dihydroxy - 15β - hydroxy - 14α - bromopregnan-20-one.

EXAMPLE 45

*3β-acetoxy-15β-hydroxy-14α-bromo-14α-card-20(22)-enolide*

A mixture of 1.55 grams of 3β,21-diacetoxy-15β-hydroxy-14α-bromopregnan-20-one and 1.7 grams of iodinated zinc granules was dried at 100 degrees for a period of eighteen hours. The mixture was then introduced into fifty milliliters of dry dioxane. To this vigorously stirred mixture was then added dropwise 2.55 grams of ethyl bromoacetate. The reaction mixture was carefully regulated by cooling or warming as necessary. After the bromoacetate had been added the solution was warmed on a steam bath to eighty degrees centigrade for a period of thirty minutes. Thereafter the reaction mixture was cooled, diluted with fifty milliliters of dry ethanol, filtered and mixed with ether and thirty milliliters of dilute hydrochloric acid. The aqueous layer was extracted twice more with ether, the combined ether extracts were washed with water, and concentrated. The residue was purified by chromatographing over Florisil magnesium silicate. Ethylene dichloride-acetone 3:1 eluted with 855 milligrams of 3β-acetoxy-15β-hydroxy-14α-bromo-14α-card-20(22)-enolide confirmed by infrared spectral data.

EXAMPLE 46

*3β-propionyloxy-15β-hydroxy-14α-bromo-14α-card-20(22)-enolide*

In the same manner as given in Example 45, 3β-propionyloxy - 21 - acetoxy - 15β - hydroxy - 14α - bromopregnan-20-one was reacted in solution with ethyl bromoacetate to give the corresponding 3β-propionyloxy-15β-hydroxy-14α-bromo-14α-card-20(22)-enolide.

EXAMPLE 47

*3β-valeryloxy-15β-hydroxy-14α-bromo-14α-card-20(22)-enolide*

In the same manner as given in Example 45, 3β-valeryloxy-21-acetoxy-15β-hydroxy-14α-bromopregnan - 20 - one was treated with ethyl bromoacetate in the presence of zinc to give 3β-valeryloxy-15β-hydroxy-14α-bromo-14α-card-20(22)-enolide.

EXAMPLE 48

*3β-acetoxy-15β-hydroxy-14α-chloro-14α-card-20(22)-enolide*

In the same manner as given in Example 45, 3β,21-diacetoxy-15β-hydroxy-14α-chloropregnan - 20 - one was treated with ethylbromoacetate in the presence of zinc to give 3β-acetoxy-15β-hydroxy - 14α - chloro-14α-card-20(22)-enolide.

In the same manner as shown in Examples 45 through 48, other 3β-acyloxy-15β-hydroxy - 14α - halo-14α-card-20(22)-enolides may be prepared by reacting the corresponding 3β,21-diacyloxy-15β-hydroxy-14α-halopregnan-20-one with ethyl bromoacetate in the presence of zinc.

Representative 3β-acyloxy - 15β - hydroxy-14α-halo-14α-card-20(22)-enolides thus-obtained include: 3β-formyloxy-, 3β-cyclopentylpropionyloxy-, 3β-isobutyryloxy-, 3β-isovaleryloxy-, 3β-hexanoyloxy-, 3β-heptanoyloxy-, 3β-octanoyloxy-, 3β-(2-furoyloxy)-15β-hydroxy-14α-bromo-14α-card-20(22)-enolide, 3β-formyloxy-, 3β-propionyloxy-, 3β-butyryloxy-, 3β-valeryloxy- and 3β-hexanoyloxy-15β-hydroxy-14α-chloro-14α-card-20(22)-enolide and the like.

Example 49

3β-acetoxy-14(15)-oxido-20(22)-cardenolide

To a solution of 0.95 gram of 3β-acetoxy-15β-hydroxy-14α-bromo-14α-card-20(22)-enolide, dissolved in fifty milliliters of acetone was added 2.5 grams of potassium acetate. The reaction mixture was stirred at the temperature of reflux in a dry atmosphere for a period of five hours. Thereafter the solution was concentrated at reduced pressure to a volume of ten milliliters and poured into 200 milliliters of ice water with stirring. The thus-obtained precipitate was collected on a filter and recrystallized from acetone to give 0.78 gram of 3β-acetoxy-14(15)-oxido-20(22)-cardenolide.

In the same manner as shown in Example 49, substituting 3β-acetoxy - 15β - hydroxy - 14α - bromo - 14α-card-20(22)-enolide with 3β-acetoxy-15β-hydroxy-14α-chloro-14α-card-20(22)-enolide produces 3β-acetoxy-14(15)-oxido-20(22)-cardenolide.

Example 50

3β-propionyloxy-14(15)-oxido-20(22)-cardenolide

In the same manner as shown in Example 49, 3β-propionyloxy - 15β-hydroxy - 14α - bromo-14α-card-20(22)-enolide was treated with soda lime to give 3β-propionyloxy-14(15)-oxido-20(22)-cardenolide.

Example 51

3β-butyryloxy-14(15)-oxido-20(22)-cardenolide

In the same manner as shown in Example 49, 3β-butyryloxy-15β-hydroxy - 14α - bromo-14α-card-20(22)-enolide was treated with sodium acetate to give 3β-butyryloxy-14(15)-oxido-20(22)-cardenolide.

In the same manner as shown in Examples 49 through 51, by reacting the corresponding 3β-acyloxy-15β-hydroxy-14α-halo-14α-card-20(22)-enolide, illustrated by Examples 45–48, with potassium acetate, sodium acetate, soda lime, and the like, the corresponding 3β-acyloxy-14(15)-oxido-20(22)-cardenolide is obtained.

Example 52

3β-hydroxy-14(15)-oxido-20(22)-cardenolide

A medium was prepared of ten grams of Cerelose dextrose, twenty grams of corn steep liquor and one liter of tap water. Twelve liters of this sterilized medium was inoculated with *Rhizopus shanghaiensis* ATCC 10329 and incubated for 24 hours at a temperature of 27 to thirty degrees centigrade, with agitation and aeration at a rate of one liter of air per minute. To this medium containing a twenty-four hour growth of *Rhizopus shanghaiensis*, 1.25 grams of 3β-acetoxy-14(15)-oxido-20(22)-cardenolide, dissolved in 100 milliliters of acetone, was added. The incubation was continued for a period of four hours with agitation and without aeration. The beer and mycelium were extracted three times with three liters of methylene dichloride. The combined extracts were washed with sodium carbonate solution and water. Upon concentration and trituration of the extractives with ether 1.05 grams of 3β-hydroxy-14(15)-oxido-20(22)-cardenolide was obtained.

Other fungi of the genus Rhizopus, esterases or lipases may be used to produce a rapid hydrolysis of the 3β-acyloxy group to a 3β-hydroxy group without attacking the 20(22)-cardenolide lactone structure. Hog or beef liver or pancreas are especially useful.

In a manner similar to Example 52, other 3β-acyloxy-14(15)-oxido-20(22)-cardenolides such as those shown and described in Examples 49 through 51 are hydrolyzed to give 3β-hydroxy-14(15)-oxido-20(22)-cardenolide.

Example 53

3β,14-dihydroxy-20(22)-cardenolide (digitoxigenin)

A solution of 500 milligrams of 3β-hydroxy-14(15)-oxido-20(22)-cardenolide, dissolved in 20 milliliters of freshly distilled dioxane, was cooled to about ten degrees centigrade. To this solution was added thirty milligrams of potassium borohydride, and one milligram of potassium chloride in five milliliters of fifty percent dioxane. The reaction mixture was then warmed to room temperature (twenty to thirty degrees centigrade) and kept for five hours at this temperature. Thereafter five milliliters of water was added and a pH of 2 obtained by adjustment with dilute hydrochloric acid. After thirty minutes the reaction mixture was concentrated in vacuo to one-fifty of the original volume. Dilution with twenty milliliters of water and extraction with chloroform gave a residue of 3β,15-dihydroxy-20(22)-cardenolide. Separation was achieved by chromatography over magnesium silicate. The component melting at 243 to 247 degrees centigrade, was separated and identified by infrared spectrum, papergram mobility and melting point in admixture with authentic digitoxigenin as 3β,14β-dihydroxy-20(22)-cardenolide (digitoxigenin).

Example 54

Digitoxigenin acetate

In the same manner as shown in Example 53, using 3β-acetoxy-14(15)-oxido-20(22)-cardenolide instead of 3β-hydroxy-14(15)-oxido-20(22)-cardenolide is productive of 3β-acetoxy-14-hydroxy-20(22)-cardenolide (digitoxigenin-3 acetate).

Example 55

3-(β - cyclopentylpropionyloxy) - 14β - hydroxy-20(22)-cardenolide

In the same manner as given in Example 53, using 3β-(β-cyclopentyl)propionyloxy-14(15)-oxido-20(22) - cardenolide instead of 3β-hydroxy-14(15)-oxido-20(22)-cardenolide is productive of 3β-(β-cyclopentyl)propionyloxy-14β-hydroxy - 20(22) - cardenolide (digitoxigenin 3-(β-cyclopentyl)propionate).

In a manner similar to Examples 53 through 55, reducing 3β-acyloxy-14(15)-oxido-20(22)-cardenolide with potassium borohydride or sodium borohydride, and the like, other 3β-acyloxy-14(15)-oxido-20(22)-cardenolides are obtainable. Similarly 3β-acyloxy - 14β - hydroxy-20(22)-cardenolides may be obtained by esterifying 3β,-14β-dihydroxy-20(22)-cardenolide according to the methods as herein described in pyridine solution with an acylating agent such as an acid halide, an acid anhydride, and the like, to obtain the corresponding 3β-acyloxy-14β-hydroxy-20(22)-cardenolide (digitoxigenin 3-acylate). Representative 3β-acyloxy-14β-hydroxy-20(22)-cardenolides thus-obtained comprise: formyloxy-, acetoxy-, propionyloxy-, butyryloxy-, isobutyryloxy-, valeryloxy-, isovaleryloxy-, hexanoyloxy-, heptanoyloxy-, octanoyloxy-, benzyloxy-, (β-cyclopentylpropionyloxy)-, dimethylacetoxy-, trimethylacetoxy-, phenylacetoxy-, toluyloxy-, anisoyloxy-, gallyloxy-, salicyloyloxy-, cinnamyloxy-, hemisuccinyloxy-, hemitartaryloxy-, dihydrogencitryloxy-, maleyloxy-, fumaryloxy-, crotonyloxy-, acrylyloxy-, (β-methylcrotonyloxy)-, cyclohexanecarbonyloxy-, chloroacetoxy-, dichloroacetoxy-, trichloroacetoxy-, bromoacetoxy, hemiquinolinoyloxy-, nicotinyloxy-, piperonyloxy-, (2-furoyloxy)-, thioglycollyloxy-, (para-chlorobenzoyloxy)-, (para-bromobenzoyloxy)-, (metanitrobenzoyloxy)-, and 3β-(3,5-dinitrobenzoyloxy)-14β-hydroxy-20(22)-cardenolide, and the like.

It is to be understood that the invention is not to be limited to the exact details or exact compounds shown and described, as obvious modifications and equivalents will be apparent to one skilled in the art, and the invention is therefore to be limited only by the scope of the appended claims.

We claim:
1. A compound selected from the group consisting of 3β,15β,21-trihydroxy-14α-halopregnan-20-one and 3β,21-diacyloxy-15β-hydroxy-14α-halopregnan-20-one wherein the halogen atom has an atomic weight between 34 and 81 and wherein the acyl radical is of a hydrocarbon carboxylic acid containing from one to eight carbon atoms, inclusive.
2. 3β,15β,21-trihydroxy-14α-bromopregnan-20-one.
3. 3β,21-diacetoxy-15β-hydroxy - 14α - bromopregnan-20-one.
4. 3β - acyloxy - 15β - hydroxy - 14α - halo - 14α - card-20(22)-enolide wherein the halogen atom has an atomic weight between 34 and 81 and the acyl radical is of a hydrocarbon carboxylic acid containing from one to eight carbon atoms, inclusive.
5. 3β-acetoxy - 15β - hydroxy - 14α - bromo-14α-card-20(22)-enolide.
6. A compound selected from the group consisting of 3β-hydroxy-14(15)-oxido-20(22)-cardenolide and 3β-acyloxy-14(15)-oxido-20(22)-cardenolide wherein the acyl radical is of a hydrocarbon carboxylic acid containing from one to eight carbon atoms, inclusive.
7. 3β-hydroxy-14(15)-oxido-20(22)-cardenolide.
8. 3β-acetoxy-14(15)-oxido-20(22)-cardenolide.

References Cited in the file of this patent
UNITED STATES PATENTS

| | | |
|---|---|---|
| 2,210,368 | Hartmann | Aug. 6, 1940 |
| 2,656,349 | Ruzicka et al. | Oct. 20, 1953 |
| 2,670,358 | Murray et al. | Feb. 23, 1954 |